United States Patent [19]
Suzuki et al.

[11] Patent Number: 5,747,774
[45] Date of Patent: May 5, 1998

[54] HEAT FIXING APPARATUS WITH TEMPERATURE CONTROL BASED ON AC POWER WAVES

[75] Inventors: Hidenobu Suzuki; Takashi Soya; Takashi Nakahara; Yasumasa Nashida; Tomoko Nanbu, all of Kawasaki; Hiroshi Takazawa, Urayasu, all of Japan

[73] Assignee: Canon Kabushiki Kaisha, Tokyo, Japan

[21] Appl. No.: 780,128

[22] Filed: Dec. 26, 1996

Related U.S. Application Data

[63] Continuation of Ser. No. 392,263, Feb. 22, 1995, abandoned.

[30] Foreign Application Priority Data

Feb. 22, 1994 [JP] Japan .................... 6-049752

[51] Int. Cl.$^6$ ........................................ H05B 1/02
[52] U.S. Cl. .................... 219/216; 219/492; 219/494
[58] Field of Search .......................... 219/216, 490, 219/492, 494, 497; 399/320, 328, 329

[56] References Cited

U.S. PATENT DOCUMENTS

| | | | |
|---|---|---|---|
| 4,180,721 | 12/1979 | Watanabe et al. | 219/216 |
| 4,340,807 | 7/1982 | Raskin et al. | 219/497 |
| 4,374,321 | 2/1983 | Cunningham, Jr. et al. | 219/497 |
| 4,604,517 | 8/1986 | Barry | 219/494 |
| 5,343,019 | 8/1994 | Nashida et al. | |
| 5,367,369 | 11/1994 | Nakai et al. | 355/285 |

FOREIGN PATENT DOCUMENTS

| | | |
|---|---|---|
| 60-163102 | 8/1985 | Japan . |
| 62-150279 | 7/1987 | Japan . |
| 2-044386 | 2/1990 | Japan . |
| 5-281864 | 10/1993 | Japan . |

*Primary Examiner*—Teresa J. Walberg
*Assistant Examiner*—Gregory L. Mills
*Attorney, Agent, or Firm*—Fitzpatrick, Cella, Harper & Scinto

[57] ABSTRACT

A heat fixing apparatus includes a heater; a temperature sensor for sensing a temperature of the heater; a bias wave number determining limit for determining the number of bias waves corresponding to a predetermined image fixing temperature in accordance with utility voltage source voltage; a bias wave number changing unit for changing a bias wave number in accordance with temperature changing rate of the heater; and a supply wave number control unit for controlling the number of waves supplied to the heater in accordance with an output of the temperature sensor and bias wave number. The unit includes a PID controller.

3 Claims, 9 Drawing Sheets

| INPUT UTILITY VOLT | Yi LEVEL |
|---|---|
| MIN | LEVEL 15 |
| ⁓ | ⁓ |
| MAX | LEVEL 8 |

FIG. 9

| INPUT UTILITY VOLT | Yb LEVEL |
|---|---|
| MIN | LEVEL 10 |
| ⁓ | ⁓ |
| MAX | LEVEL 7 |

HEAT FIXING APPARATUS WITH TEMPERATURE CONTROL BASED ON AC POWER WAVES

This application is a continuation of application Ser. No. 08/392,263, filed Feb. 22, 1995, now abandoned.

BACKGROUND OF THE INVENTION

1. Field of the Invention

The present invention relates to a heating and fixing device usable for an image forming apparatus such as a copying machine, a printer and a facsimile machine, and, more particularly to the heating and fixing device maintaining the temperature of a heater at a predetermined temperature by changing a wave number of AC electric power supplied to the heater.

A conventional fixing device for an image forming apparatus such as a copying machine, generally is provided with a heater, and toner transferred onto a transfer material (for example, paper) at an image forming portion is fused and fixed on the transfer material by heating with the heater. Such a fixing device is provided with an electric power control device for maintaining, at the predetermined temperature, the temperature of the heater by controlling an amount of the supply of the electric power to the heater. The electric power control device is provided with a TRIAC for ON/OFF control of a utility voltage source, for example. In synchronism with the zero-cross point of the utility voltage source and TRIAC or without synchronization but adjacent to the zero-cross, a trigger means renders it ON, OFF. The ON-duty of the trigger output signal emitted by the trigger means is changed, by which the electric power is controlled (so-called "PWM").

By this activity, the wave number control for the electric power supply to the heater is executed so as to maintain the temperature of the heater at a target temperature suitable for the toner fixing.

Figure 8:
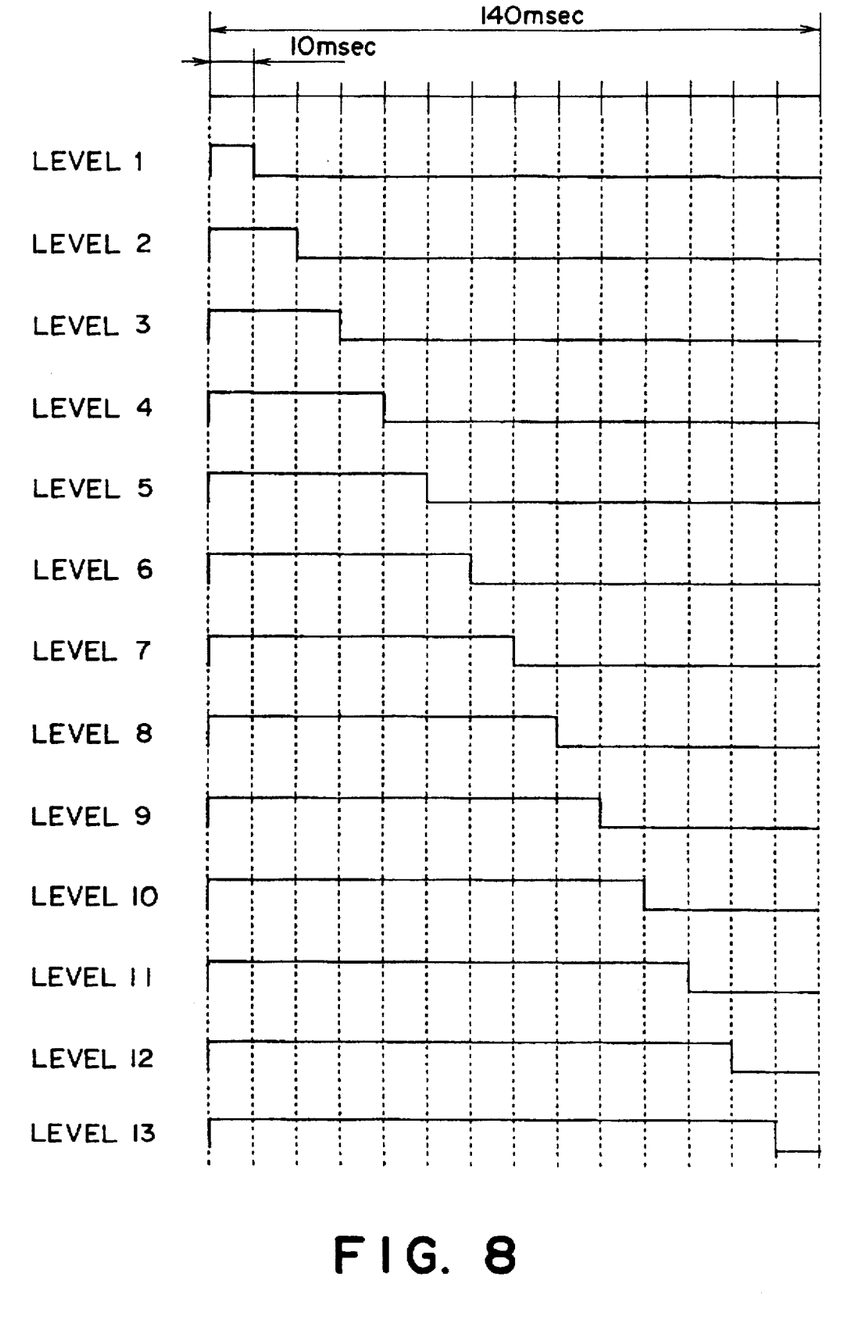
FIG. 8 illustrates a signal output pattern of a conventional FSRD.

FIG. 8 shows an output pattern of PWM control for the electric power by changing the ON-duty of the trigger output signal. In this figure, in a predetermined time (140 msec), one ON/OFF action is executed, and in addition, the minimum duty width is set to 10 msec. There are provided level 1 to level 13 output levels, and an amount of the supply of the electric power to the heater is adjusted by selecting the output level in response to the temperature of the heater.

In another known electric power control device, the zero-cross of the utility voltage source is detected by a zero-cross detection element, and on the basis of the detection, the phase angle is determined (so-called phase control) to control the electric power supplied to the heater. By using the phase control, the energization can be advantageously executed with fine gradation, whereas parts are required to be added for the zero-cross detection and/or the contact noise countermeasure, and therefore, the cost increases.

Figure 11:
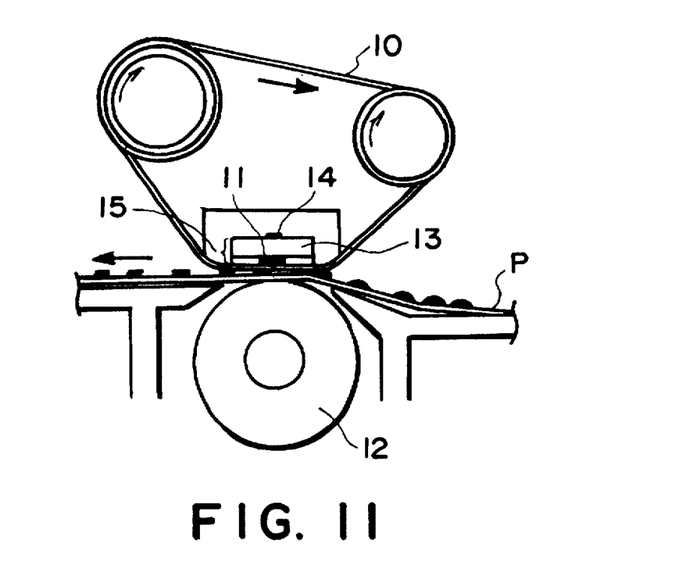
FIG. 11 is a sectional view of a heating and fixing device.

For this reason, as to the control method for the electric power supply from the standpoint of low cost, it is preferable to switch the energization wave number level in response to the temperature of the heater, without detecting the zero-cross of the utility voltage source. However, with such an electric power control, there are some problems when temperature control of the fixing device using the fixing film having a small heat capacity as shown in FIG. 11, for example, is executed.

The fixing device provided with the fixing film will be briefly described. An endless heat resistive film 10 is used as a fixing film, and the fixing film is nipped and passed between the heater 15 including a heater 11 (heat generating element) disposed in the fixing film and an outside pressing roller 12. In addition, into the fixing nip portion between the pressing roller 12 and the fixing film 10, the transfer material P is inserted, and at this time, the heat energy of the heater 11 is applied to the toner on the transfer material P through the fixing film 10 so as to fuse the toner and to fix it on the transfer material.

The temperature of the heater 11 is detected by a thermistor 14 through the base plates 13 of a material having a high thermal conductivity, such as alumina. An unshown electric power supply control means controls the electric power supply to the heater 11 so that the detected temperature of the thermistor 14 maintains the fixing temperature at a predetermined level. The feature of the fixing device using such a fixing film is that the heat capacities of the fixing film and the heater are set to be small (small resistance value) in order to execute a quick temperature rise.

The conventional electric power control for such a fixing device involves the following problems:

(1) the heat capacity of the fixing device is small, and, therefore, the temperature of the fixing device has to be sampled in a relatively short time (for example, approx. 7 Hz) and has to be feedback-controlled and PWM-controlled. In such a case as the above-described, the resistance value of the heater is small, and the line impedance of the utility voltage source connected with the fixing device is high, there is the liability that the flickering capable of being observed by a person is produced in external equipment (for example, the fluorescent lamp or the like) with the above-described PWM period (for example, conventionally 7 Hz approx.).

(2) In the case that the frequency is varied in order to trigger the TRIAC without synchronization with the zero-cross of the utility voltage source, and in the case that the voltage source frequency is changed between 50 Hz and 60 Hz, then, when the minimum duty width of the trigger output signal is always fixed (in the foregoing description 10 msec), as described hereinbefore, ON or OFF of the half wave for the utility voltage source cannot be executed in some cases.

(3) Because of the structure for triggering the TRIAC without synchronization with the zero-cross of the utility voltage source, the above-described TRIAC cannot be triggered by the above-described trigger means in some cases.

4) The fixing device temperature is maintained at the target temperature in the structure wherein the electric power is PWM controlled by changing the ON-duty of the trigger output signal, and therefore, the fixing temperature involves a temperature ripple at the PWM period (in the foregoing description approx. 7 Hz), and the deterioration of the image quality by the fixing non-uniformity results.

SUMMARY OF THE INVENTION

An object of the present invention is to provide a heating and fixing device wherein flickering produced from the outside equipment is reduced.

Another object of the present invention is to provide a heating and fixing device capable of executing energization with the proper wave number even if the input voltage varies greatly.

A further object of the present invention is to provide a heating and fixing device capable of reducing a phase deviation even if a zero-cross of an AC waveform is not detected.

A further object of the present invention is to provide a heating and fixing device capable of executing the correct ON/OFF energization of the half wave even if the frequency of the utility voltage source varies.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
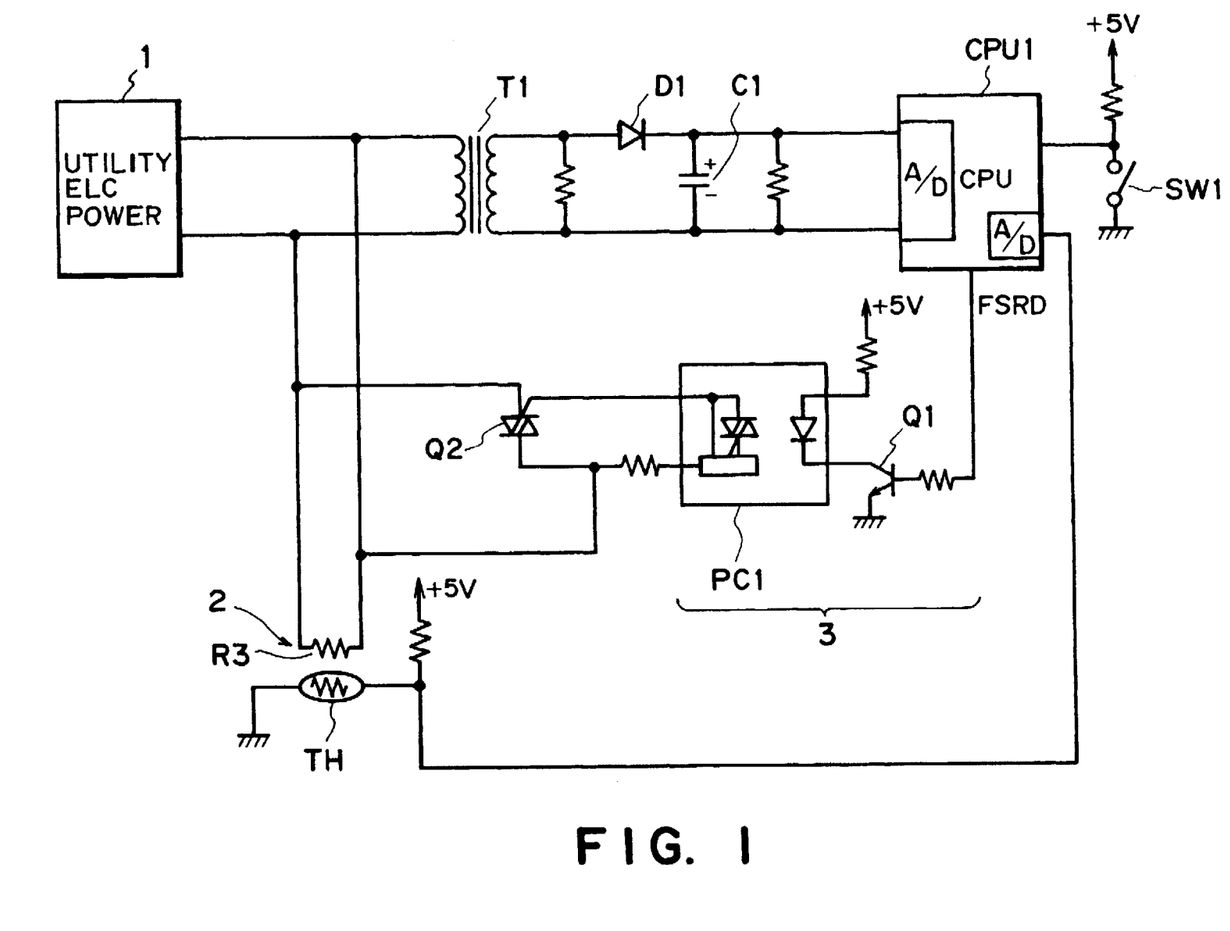
FIG. 1 is a schematic drawing illustrating a system structure of an electric power control device according to the present invention.

FIG. 1 shows a system arrangement of a heating and fixing device of the present invention. The structure of the heating and fixing device is the same as in FIG. 11. A voltage supplied from a utility voltage source 1 is changed by a transformer T1, and a holding capacitor C1 is charged through a diode D1 by the voltage thus changed. The voltage of the holding capacitor C1 is supplied to an A/D input port of CPU 1, and the input utility power source voltage inputted from the above-described utility voltage source 1 is monitored.

A switch SW1 is a 50 Hz/60 Hz change-over switch and corresponds to 50 Hz in the ON state and 60 Hz in the OFF state in this embodiment. The heater 2 includes a heat generating element including a ceramic heater R3, and the temperature detection is executed by a thermistor TH as the temperature detection means. The thermistor TH is connected with the A/D input port of the above-described CPU 1, and the CPU 1 monitors the state of the temperature of the above-described fixing device through the thermistor TH.

When the FSRD signal is at the H level the electric power supply is started from the utility voltage source 1 to the ceramic heater R3, and the supply is stopped when it is at the L level. In other words, when the FSRD signal is at the H level, the transistor Q1 is actuated through the CPU 1 so that a photo-TRIAC PC1 is actuated by the collector output thereof, and in addition, a gate of a TRIAC Q2 (control switch) is actuated by which the utility voltage source 1 is triggered at the timing close to the zero-cross, thus starting the supply of the utility electric power to the ceramic heater R3.

On the other hand, in the case of the L level of the above-described FSRD signal, the situation is the opposite. The transistor Q1 is OFF, and the photo-TRIAC PC1 is OFF by the collector output so that the gate of the TRIAC Q2 is deactuated. It is triggered at the timing close to the zero-cross so as to stop the supply of the utility electric power to the ceramic heater R3.

The detailed description will be made as to an energization wave number determination process for the ceramic heater R3. In this embodiment, the utility voltage source wave number applied to the ceramic heater R3 (controlled parameter) for each predetermined time TS by the utility voltage source 1 is determined, on the basis of the relation among an output wave number determined in response to an amount e of a deviation (=VO−VTH) between the control target voltage value VO (=the target a temperature of Tb) and the voltage value VTH of the above-described thermistor TH (negative property), the bias wave number (reference wave number) determined in response to an amount of integration (=e×Ti, per a predetermined time Ti), of an amount e of the above-described deviation and a bias wave number determined in response to an amount d the differential (=VTHn−VTH (n−1), per the time TS, of the voltage value VTH of the above-described thermistor TH, namely, the temperature change ratio.

On the basis of the determination, the wave number control for executing ON and OFF of the above-described FSRD signal is processed by CPU 1. The operation determining the output wave number from the amount of e the deviation is called "P-operation", the operation determining the bias wave number from the amount of i the integration is called "I-operation", and the operation determining the bias wave number from the amount of d the differential is called "D-operation", and in addition, the operation all together is called "PID-operation".

Figure 2:
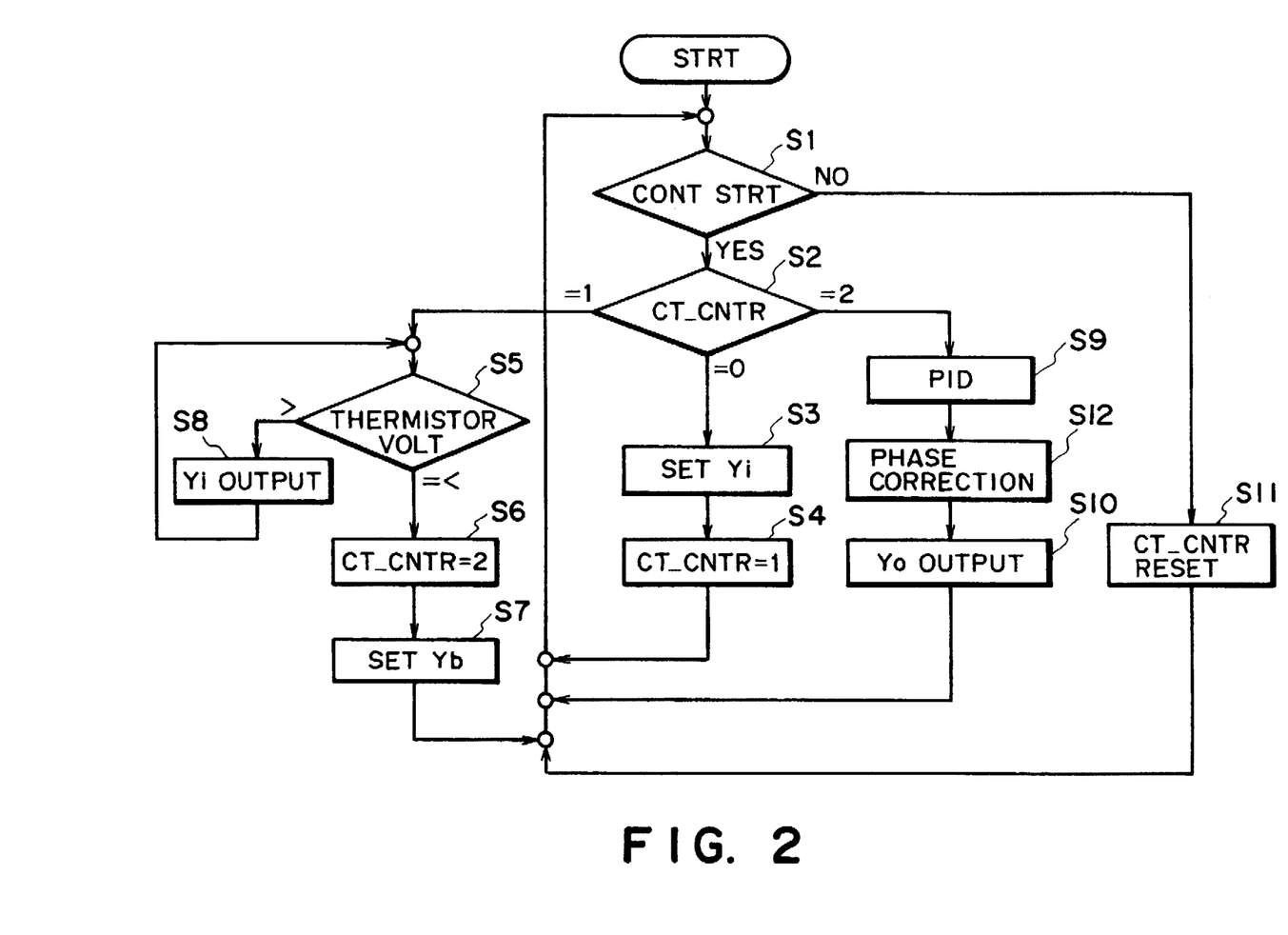
FIG. 2 is a flow chart illustrating an operation of an electric power control device.
Figure 3:
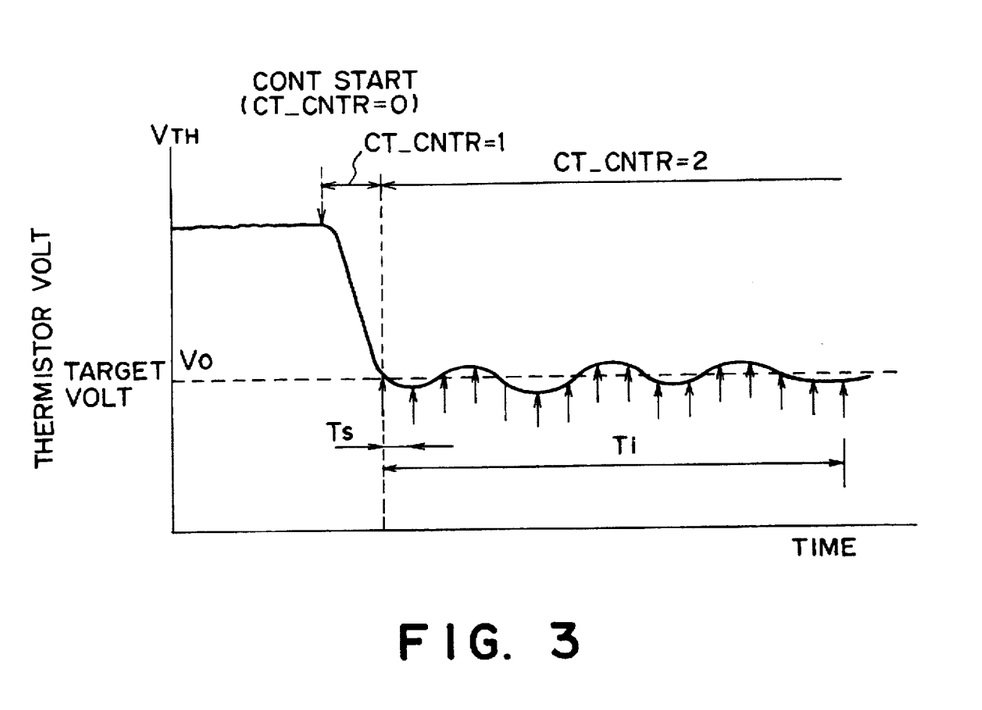
FIG. 3 illustrates a relation between a sampling and a thermistor voltage.

FIG. 2 is a flow chart of the above-described PID-operation and FIG. 3 shows the relation between the sampling and the thermistor voltage value VTH of the control result.

Figure 9:
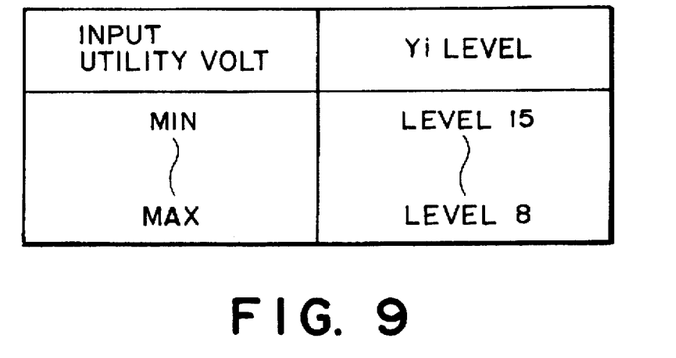
FIG. 9 illustrates a relation between an output wave number level Yi and an input utility voltage source.

In this embodiment, the PID-operation is executed with the specifications of 100V/120V. At S1, the monitoring of the start of the temperature control is executed. If it is in the state of stop of the control the operation transits to S11, and as will be described hereinafter, the control counter CT-CNTR is reset, and then, the operation returns to S1. On the other hand, in the case of the state of the control start, the operation transits to S2, and the data of the control counter CT-CNTR is referenced. In S2, if the data of the control counter CT-CNTR is "0", the fixing device rising initial stage setting (warm-up before start) is discriminated, and the operation goes to S3. If it is "1" the fixing device rising control (during warm-up) is discriminated, and the operation goes to S5. If it is "2", the normal control of the fixing device is discriminated (PID-operation, constant temperature control) and the operation proceeds to S9. In S3, as shown in FIG. 1, referring to the holding capacitor voltage, the output wave number level Y1 such that the electric power supplied to the ceramic heater R3 is constant, even if the utility power source voltage changes, is selected as shown in the Table of FIG. 9.

At S4, the control counter is set to CT-CNTR=1, and the operation returns to S1. In S5, the thermistor voltage value VTH is monitored, and if the relation with the target voltage value VO does not reach the target temperature of Tb namely, VTH>VO, the operation proceeds to S8, if VTH≦VO, the operation proceeds transits to S6. In S8, the output wave number level Ti selected at S3 is outputted from the above-described FSRD signal in order to continue the fixing device rising control when the voltage value VTH reaches the target voltage value VO, the operation transfers to S6, and completions of the fixing device rising control is discriminated.

Figure 10:
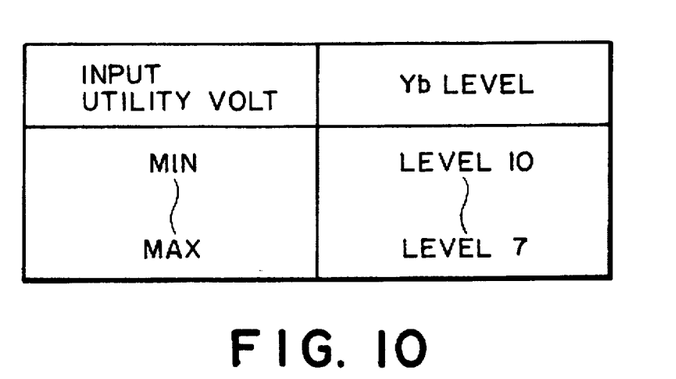
FIG. 10 illustrates a relation between a bias wave number level Yb and an input utility voltage source.

In order to move to the fixing normal control (PID-operation) the control counter is set to CT-CNTR=2, and the operation transits to S7. In S7, the bias wave number level Yb corresponding to the utility power source voltage is selected as shown in the Table of FIG. 10, depending on the voltage value of the holding capacitor C1 at the above-described S3, and the operation returns to S1. In S9 the thermistor voltage value VTH is monitored for each predetermined time TS as shown in FIG. 3 in order to execute the fixing normal control (PID-operation), and the calculation of the wave-number for the P-operation, the I-operation and the D-operation is executed.

In the PID-operation, by the I-operation, firstly, the bias wave number level Yb is updated on the basis of the following equation from an amount of i the above-described integration.

$$Yb = Ki \times i \times Yb(n-1)$$

where Ki is I-operation gain.

Subsequently, in the case that an amount of the deviation e satisfies e≧0, and an amount of differential d≦0, or in the case that e<0 and d>0 are satisfied, the bias wave number level Yb already updated by I-operation is updated by the bias wave number changing means (not shown) on the basis of the following equation, from the amount of d the differential, by the D-operation.

$$Y_{bn} = K_d \times d + Y_b$$

where Kd is D-operation gain.

Finally, by the P-operation the output wave number level Yo is calculated on the basis of the following equation from the amount e of the above-described deviation relative to the bias wave number level Ybn determined by the above-described I-operation and D-operation.

$$Y_o = K_p \times e + Y_{bn} = (K_p \times e) + (K_i \times i) + (K_d \times d) \times Y_b(n-1)$$

where Kp is a gain of P-operation.

By the above-described D-operation the following effect is provided.

The heater temperature is higher than the target temperature, and despite a decrease of the output wave number by the P-operation, in the case that the heater temperature rises (it can occur when the input voltage to the fixing device varies significantly), the system can adjust to the change only by changing the bias wave number. In this embodiment in the case of e≧0 and d≦0, or in the case of e<0 and d>0, the D-operation is executed, but the present invention is not limited to it and in the case of e≧0 and d≦X (X is negative), or in the case of e<0 and d>Y (Y is positive), it may be executed.

Subsequently, in S12, in the case of the deviation amount of |e|≧θ$_{TH}$ (FIG. 4), a deviation occurrence between the trigger timing of the FSRD signal and the trigger timing of the TRIAC Q2 adjacent the zero-cross trigger timing of the utility voltage source 1 of FIG. 1 is discriminated, and the FSRD signal output phase is changed to be deviated from the output start timing of the FSRD signal. Specifically, by the timer of the trigger output start timing changing means (not shown) in CPU 1 the wait time is generated, and the phase of the output start of the FSRD signal is delayed.

Figure 4:
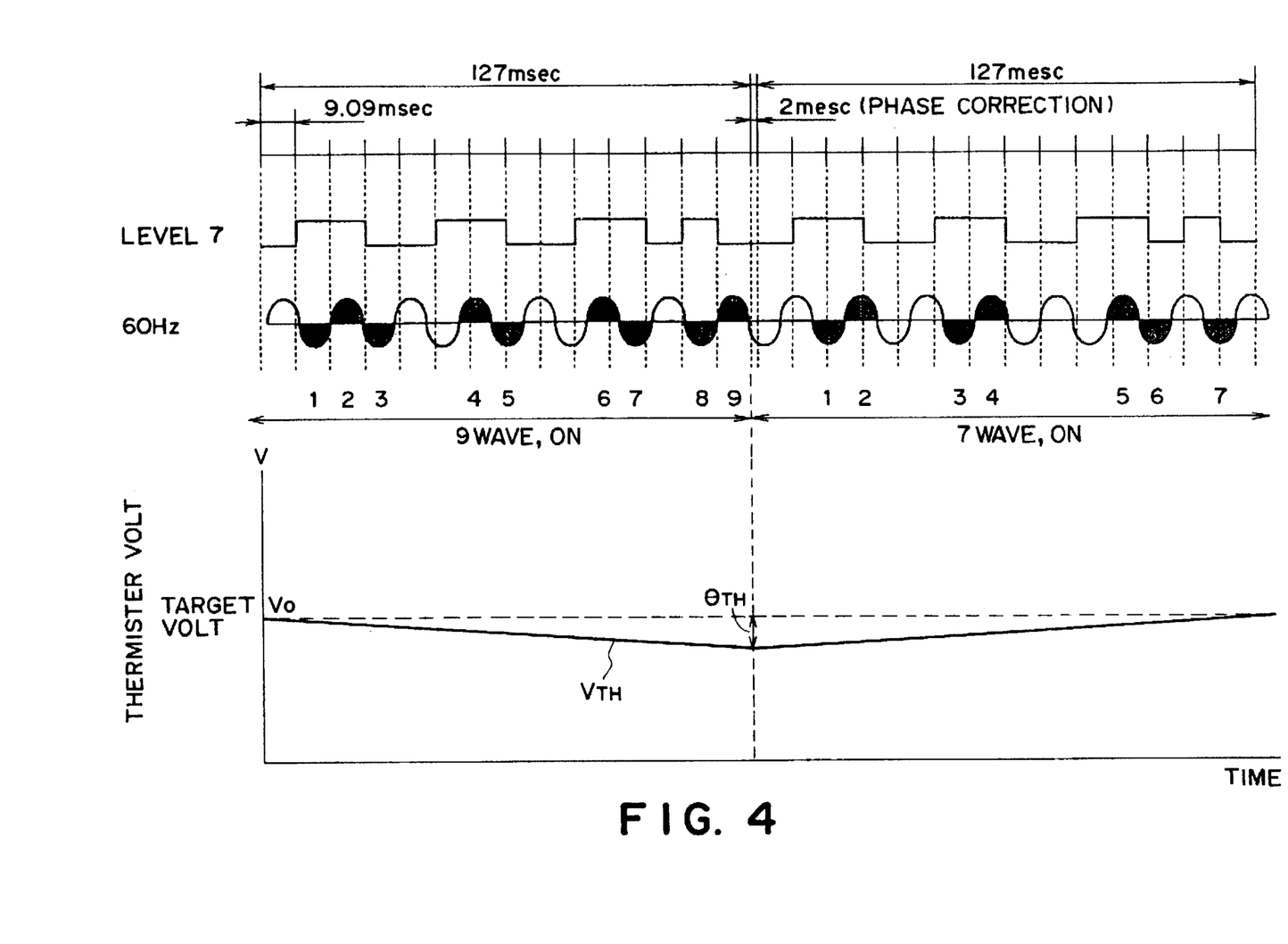
FIG. 4 illustrates a phase deviation among a utility voltage source, a FSRD signal and a thermistor voltage.

On the contrary, in the case of |e|<θ$_{TH}$, non-large deviation between the trigger timing of the FSRD signal and the trigger timing of the TRIAC Q2 is discriminated, and the FSRD signal output phase is not changed.

Here, the value of θ$_{TH}$ is selected to be larger than the deviation occurring in the normal state without deviation between the trigger timing of the FSRD signal and the trigger timing of the TRIAC Q2 with a constant input utility voltage.

FIG. 4 shows a relation of S12.

In FIG. 4, amount of the deviation is |e|≧θ$_{TH}$ with the utility voltage of 60 Hz. In the case that LEVEL 7 is outputted with a utility frequency of 60 Hz, the trigger timing of the FSRD signal and the trigger timing of the TRIAC Q2 the time deviation may occur between, and in this case 9 wave which is more than 7 wave expected originally by LEVEL 7 in the period Ts is supplied in some cases. If this occurs, a wave number which is larger than the output wave number calculated from the PID processing is outputted, and therefore, the supply electric power to the fixing device becomes excessive, and VTH decreases unnecessarily.

As described above, if the absolute value of e is larger than the value described above, the FSRD signal is started with 2 msec delay by the trigger output start timing, by which, in the next Ts period, 7 wave is supplied as expected. By doing so, the phase deviation can be predicted without detection of the zero-cross, so that the proper control can be accomplished.

At S10, in order to effect normal fixing apparatus control, the output wave number level Y0 calculated at S9, is outputted from FSRD with the phase processed at S12.

Figure 5:
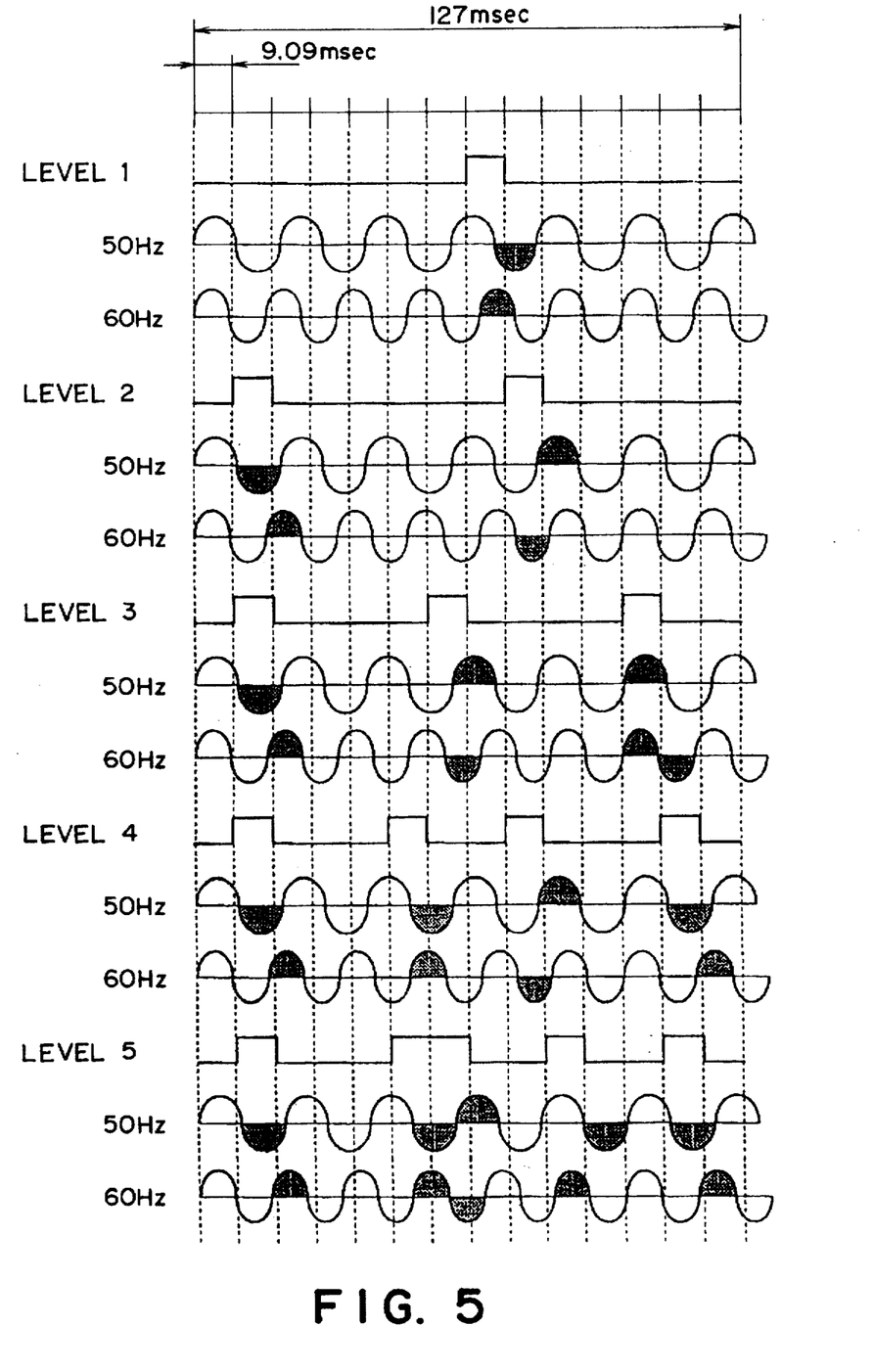
FIG. 5 illustrates a relation between a utility voltage source and a FSRD signal output pattern (from level 1 up to level 5).
Figure 6:
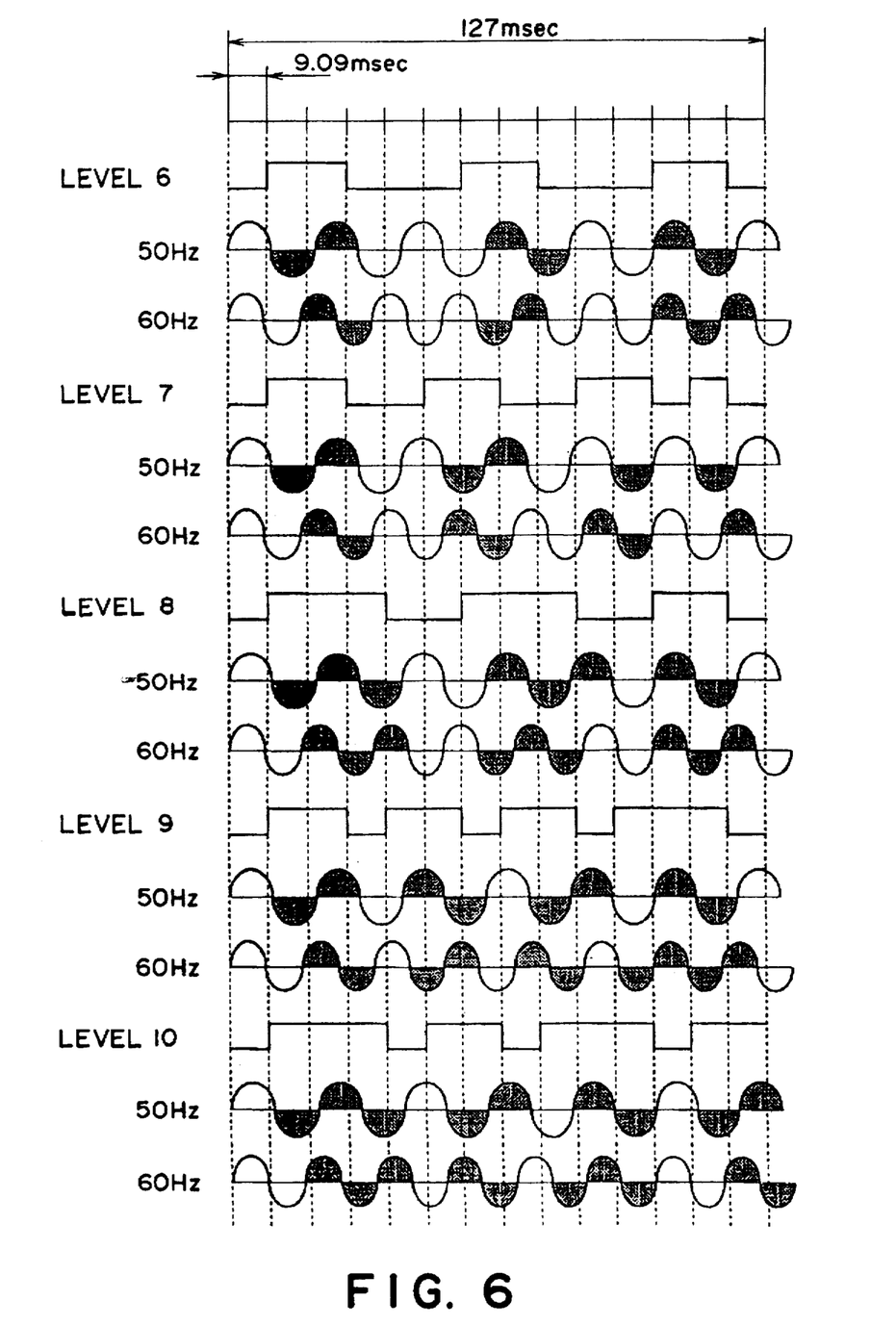
FIG. 6 illustrates a relation between a utility voltage source and a FSRD signal output pattern (from level 6 up to level 10).
Figure 7:
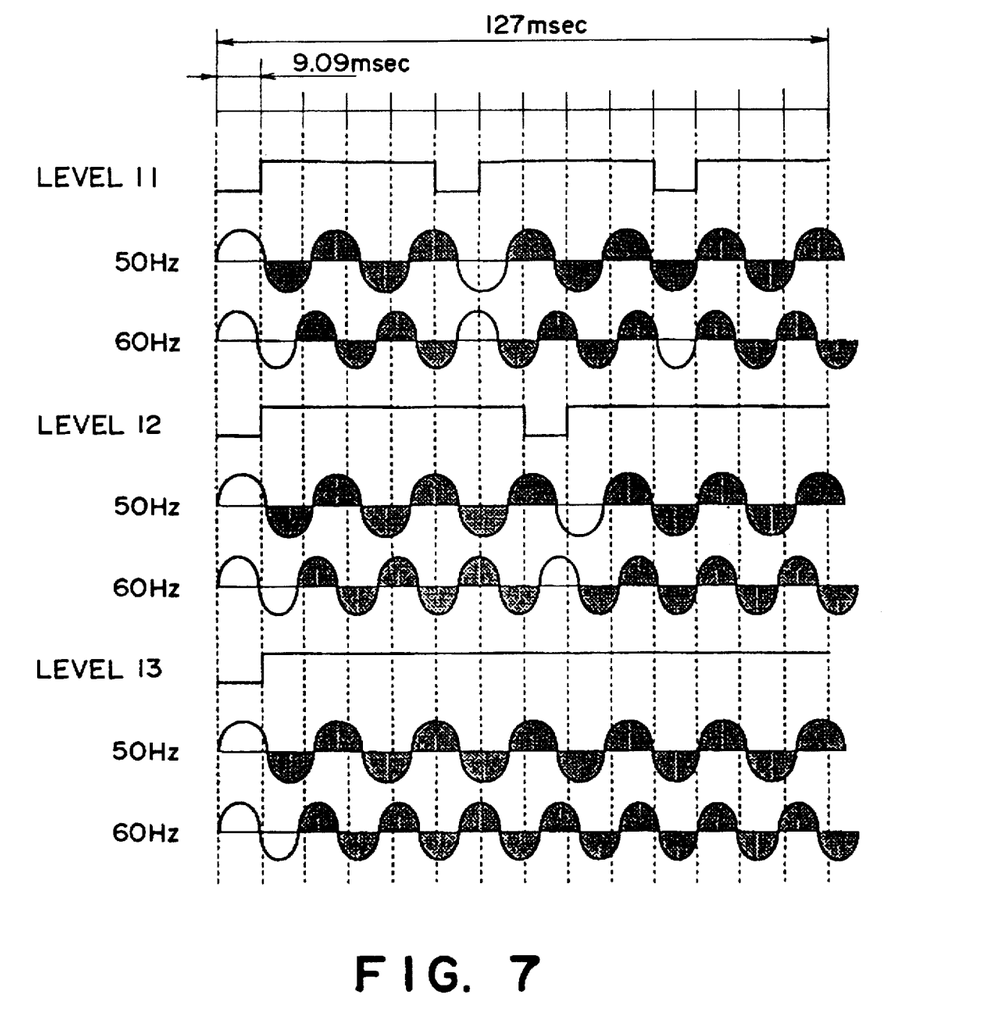
FIG. 7 illustrates a relation between a utility voltage source and a FSRD signal output pattern (from level 11 up to level 13).

The output wave number level Yi and Yo are converted to the pattern shown in FIGS. 5, 6 and 7 in the CPU 1, and outputted from the FSRD signal. In FIGS. 5, 6 and 7, the minimum output time is 9.09 msec as the pattern for both of 60 and 50 Hz. With ON-state of the switch SW1 in FIG. 1, 50 Hz is detected, and the output minimum time is made 10 msec, and with OFF-state thereof, 60 Hz is detected, and the output minimum time is made 8.33 msec, thus changing the trigger output minimum time. This is effected by unshown trigger output minimum time changing means. In this manner, the minimum time of the trigger signal is changed in accordance with the frequency of the utility voltage source, and therefore, the half-wave ON/OFF can be corrected effected, so that the phase deviation is minimized.

There are provided 15 levels (level 0 to level 14) for the output wave number levels Yi and Yo. The number of switching between ON and OFF is limited to 8, in this embodiment, that is, levels 0 and 14 are omitted because level 0 is always L and level 14 is always H. The trigger signal output means (not shown) functions to make it less than or equal to 8. The ON-period is set so that the power per unit time to the heater R3 when the level is level-n (n=0–14) satisfies $$W = (\text{source voltage})^2 / R \times (n/14)$$

by doing so, the visible flickering can be avoided.

As described in the foregoing, the optimization of the trigger output minimum time on the frequency, the phase correction of the output signal, control of the bias wave number by D-operation, the limit setting for the ON/OFF switching of the output patterns, are effective to provide the following advantages:

(1) the output pattern is increased from 20 Hz to 30 Hz, by which, for example, the flickering can be reduced to the non-visible level even if the resistance of the heater is small, and the impedance of the utility voltage source is high.

(2) by the phase correction of the TRIAC output signal, accurate ON/OFF of the half-wave can be effected even if the TRIAC IS triggered without synchronization with the zero-cross of the voltage source.

(3) by phase correction of the TRIAC output signal, the correct ON/OFF of the half wave is permitted even if the frequency variation occurs.

(4) by increasing the frequency of the output pattern from 20 Hz to 30 Hz, temperature ripple decreases, so that the image quality can be improved.

(5) without adding a zero-cross detector, the flicker level can be improved, so that the number of parts and the cost are not increased.

(6) by the bias wave number control using D-operation, even if the input voltage abruptly changes, and the state is maintained, the result of the control can be stabilized without hunting.

(7) from 20 Hz to approx. 30 Hz, the number of the ON/OFF switchings is limited so that the contact noise can be avoided.

While the invention has been described with reference to the structures disclosed herein, it is not confined to the details set forth and this application is intended to cover such modification or changes as may come within the purposes of the improvements or the scope of the following claims.

What is claimed is:

1. An image heating apparatus, comprising:
   a heater;
   a temperature detecting element for detecting a temperature of said heater;
   AC power supply control means for controlling a number of waves of AC power supplied to said heater so that the temperature detected by said temperature detecting element is maintained at a predetermined temperature, said control means determining the number of waves in accordance with a variable reference wave number and a difference between the predetermined temperature and the temperature detected by said temperature detecting element; and
   reference wave number changing means for changing the reference wave number in accordance with a temperature changing rate of said heater, wherein said reference wave number changing means changes the reference wave number when the temperature detected by said temperature detecting element is greater than the predetermined temperature and the temperature changing rate is greater than a predetermined rate, or when the temperature detected by said temperature detecting element is less than the predetermined temperature and the temperature changing rate is less than the predetermined rate.

2. An apparatus according to claim 1, wherein an initial reference wave number is determined in accordance with a temperature difference between the predetermined temperature and the temperature detected by the temperature detecting element integrated over a predetermined time intervals.

3. An apparatus according to claim 1, further comprising a film having a first side in contact with and movable together with an unfixed image, and a second side slidably contacting said heater and opposing said first side.

* * * * *

UNITED STATES PATENT AND TRADEMARK OFFICE
CERTIFICATE OF CORRECTION

PATENT NO. : 5,747,774

DATED : May 5, 1998

INVENTOR(S) : Hidenobu SUZUKI, et al.

It is certified that error appears in the above-identified patent and that said Letters Patent is hereby corrected as shown below:

ON THE COVER PAGE:

AT [57] ABSTRACT:

Line 3, "limit" should read --unit--.

Signed and Sealed this

Third Day of November, 1998

Attest:

BRUCE LEHMAN

Attesting Officer

Commissioner of Patents and Trademarks